March 10, 1925. 1,529,487

M. G. KIESLING

DIRIGIBLE AUTOMOBILE HEADLIGHT

Filed April 25, 1923 2 Sheets-Sheet 1

Inventor

Max G. Kiesling

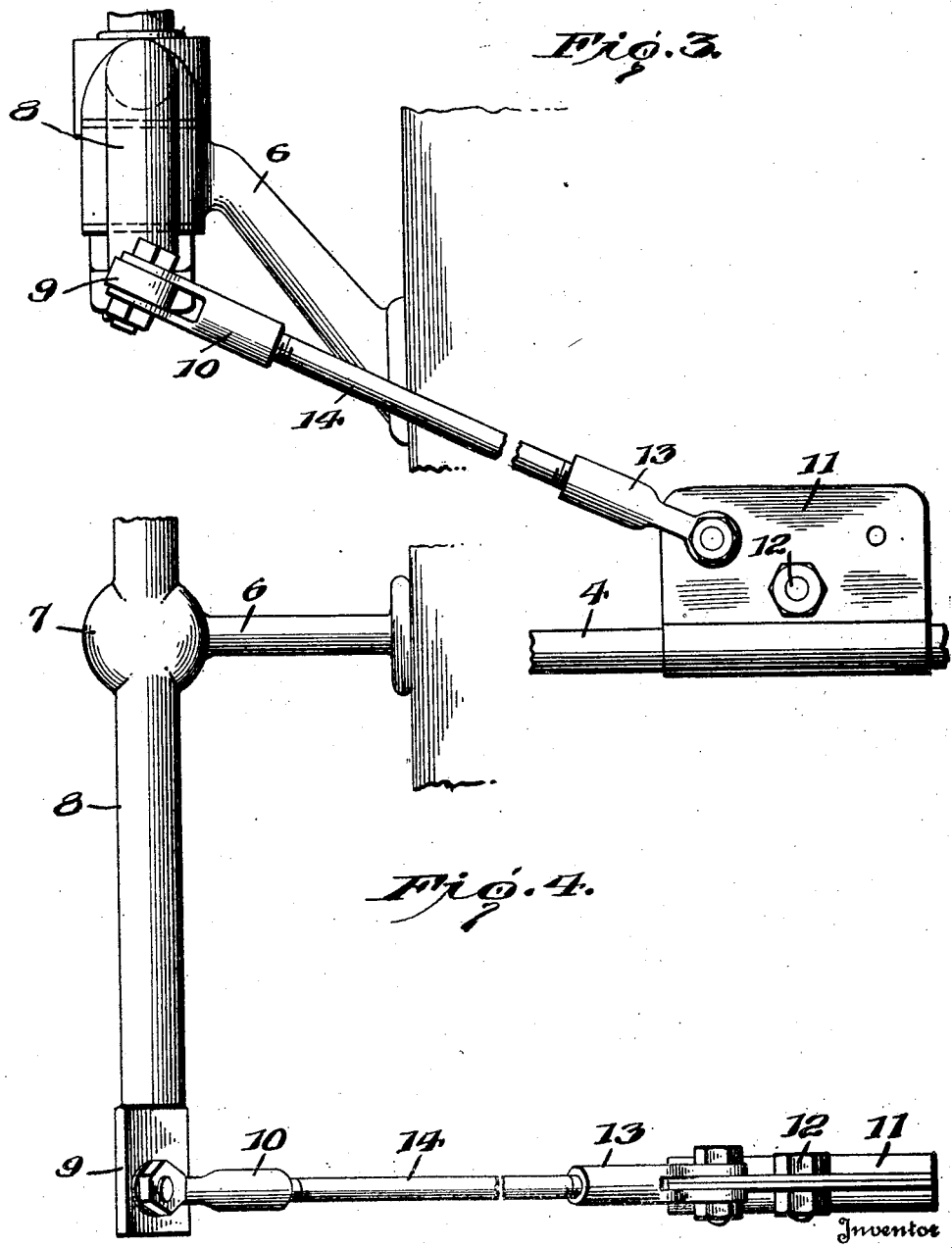

Patented Mar. 10, 1925.

1,529,487

UNITED STATES PATENT OFFICE.

MAX G. KIESLING, OF SALT CREEK, WYOMING.

DIRIGIBLE AUTOMOBILE HEADLIGHT.

Application filed April 25, 1923. Serial No. 634,514.

*To all whom it may concern:*

Be it known that I, MAX G. KIESLING, a citizen of the United States, residing at Salt Creek, in the county of Natrona and State of Wyoming, have invented certain new and useful Improvements in Dirigible Automobile Headlights, of which the following is a specification.

This invention relates to new and useful improvements in dirigible automobile headlights and the principal object of the invention is to provide a device which will cause the lights to turn upon the operation of the steering wheel.

Another object of the invention is to provide a device which will illuminate the roadway at all times regardless of whether the operator is turning a corner or traveling in a straight away path.

A still further object of the invention is to provide a novel means for mounting the headlights so that they may be readily turned.

And a still further object of the invention is to provide an automobile with headlights of the above indicated character, which can be installed at a relatively low cost.

These and like objects of the invention will be better understood as the description follows and as is specifically pointed out in the appended claim.

Referring to the accompanying drawings which form a part of this specification and which clearly show the construction and use of my improved headlight, Figure 1 is a front elevation of an automobile equipped with headlights constructed in accordance with my invention.

Figure 3 is a rear end view of one end of an automobile showing my invention applied thereto, and Figure 4 is a top plan view of Figure 3.

Referring to the accompanying drawings in detail, like characters will be used to designate like parts in the different views.

Figure 1:
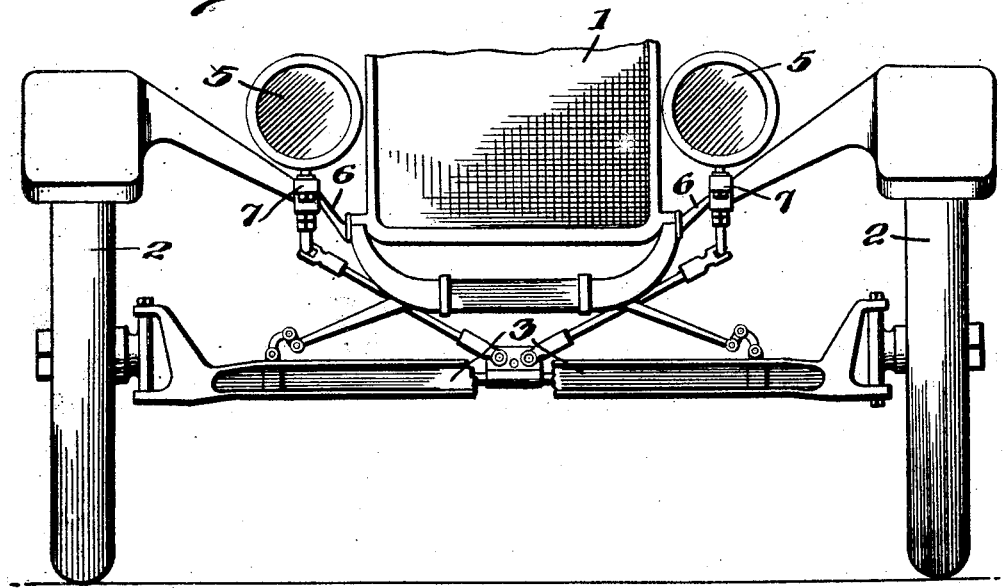
Figure 2:
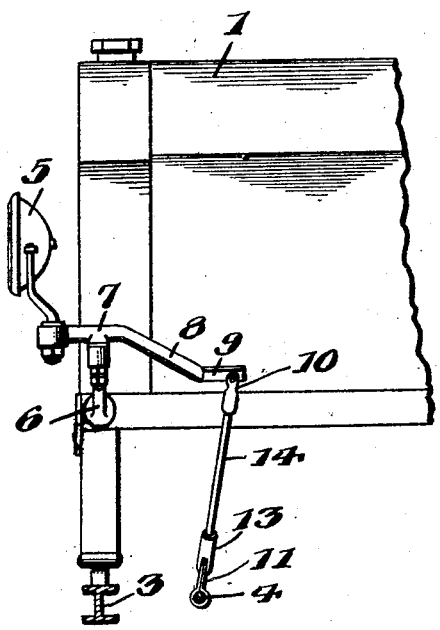
Figure 2 is a side view of same.

In the drawings, the numeral 1 indicates as a whole an automobile of any desired make, having the usual wheels 2 mounted on stub axles carried by the front axle 3. The numeral 4 designates a rod which is positioned directly in the rear of the front axle 3 and which connects the spindles of the stub axles on which the wheels 2 are mounted.

The headlights 5 are supported by brackets 6 on each side of the automobile. Instead of mounting the headlights 5 directly on the brackets 6 as is customary, a second bracket 7 is attached to each of the brackets 6 and projects to the front and rear of the automobile, the front end of the bracket 7 supporting the headlight 5, while the rear end of the bracket is bent downwardly as at 8 and is provided with a flat portion 9 and has connected thereto a threaded tubular coupling link 10.

A U-shaped clamp 11 is secured on the connecting rod 4 by means of a bolt 12 and the U-shaped clamp is provided with apertures adjacent each end, for securing thereto a tubular threaded coupling link 13. A rod 14 which is provided with screw threads at each end is adapted to be received in the coupling links 10 and 13 and can be so adjusted, as to cause the lights to display their glare directly ahead when the machine is traveling in a straight path, but when the operator of the machine turns the wheels to the right or left, thus moving the connection rod 4 either to the right or left, the plate 11 moving with the rod 4, causes the headlights to turn in the direction in which the wheels are being turned, by means of the connecting rods 14, thus fully illuminating the roadway at all times, regardless of the direction of travel of the automobile.

In view of the foregoing description of my invention taken in connection with the accompanying drawings, it is thought that any further explanation as to the construction, operation, and objects of the invention is unnecessary.

While I have shown and described the preferred form of my invention, I realize that various minor changes may be resorted to, without departing from the spirit and scope of the invention as claimed, and therefore, I do not wish to limit myself to the exact details of construction shown.

What I claim as new and desire to secure by Letters Patent is:

In combination with an automobile body having a spindle connecting rod, of a pair of brackets carried by said body, said brackets having vertical openings in the outer ends thereof, substantially T-shaped lamp supporting brackets, each comprising a horizontal arm with a vertical bearing sleeve at one end to receive the shank of the lamp and a downwardly inclined arm projecting from the other end and provided with a flat portion, a depending vertical arm carried by each of said horizontal arms, said vertical arms being received in said vertical openings in said brackets to pivotally support said horizontal lamp supporting arms, a clamp secured to said spindle connecting rod intermediate its ends, tubular threaded coupling links pivotally connected to said clamp and said flat portions, and a pair of rods having their opposite ends threaded and received in said couplings to pivotally connect each of said horizontal arms with said clamp.

In testimony whereof, I have affixed my signature in the presence of two witnesses.

MAX G. KIESLING.

Witnesses:
CHARLES HENRY KIESLING,
MORG. KIESLING.